United States Patent Office 3,163,663
Patented Dec. 29, 1964

3,163,663
2α-METHYL-Δ³-ANDROSTENE-17-HYDRO-
CARBON DERIVATIVES
Alexander D. Cross and Albert Bowers, Mexico City,
Mexico, assignors, by mesne assignments, to Syntex
Corporation, a corporation of Panama
No Drawing. Filed Dec. 4, 1961, Ser. No. 156,984
7 Claims. (Cl. 260—397.5)

The present invention relates to novel cyclopentanophenanthrene compounds and to a process for the production thereof.

More particularly the present invention relates to novel Δ³-androstene derivatives.

The novel compounds of the present invention which are potent anabolic agents with low androgenicity and which exhibit anti-estrogenic and anti-gonadotrophic activities and lower the cholesterol level in the blood serum and liver, are represented by the following formula:

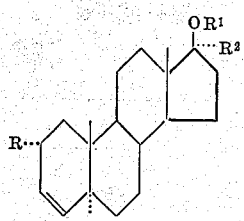

In the above formulas R may be hydrogen or methyl; $R^1$ represents hydrogen or a hydrocarbon carboxylic acyl group containing less than 12 carbon atoms; $R^2$ may be hydrogen or an alkyl, alkenyl or alkynyl group of up to 6 carbon atoms.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the process exemplified by the following equation:

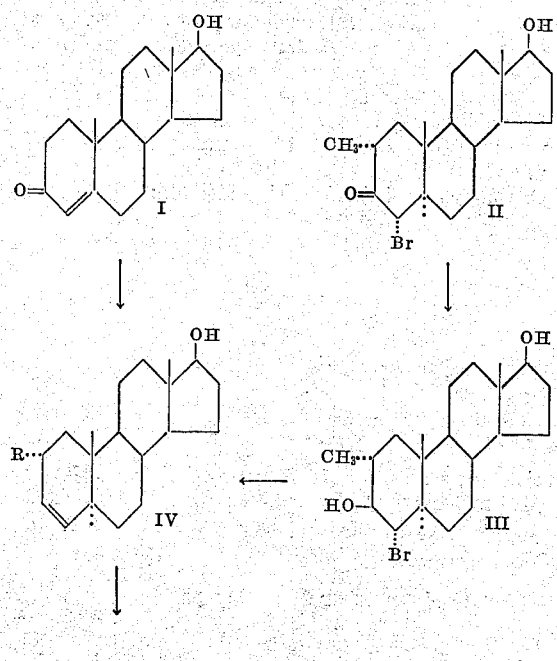

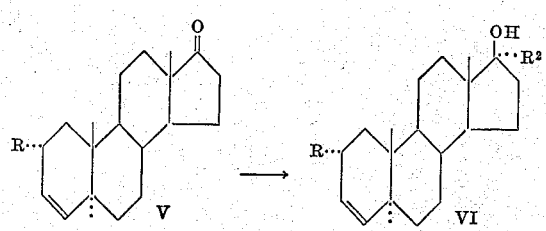

In the above formulas R and $R^2$ have the same meaning as previously described.

In practicing the process outlined above one of the starting compounds which is testosterone (I) is treated with hydrazine hydrate and the formed hydrazone is decomposed by heat preferably in ethylene glycol at reflux temperature, thus yielding the corresponding Δ³-androsten-17β-ol derivative (IV; R=H).

Following a second sequence of reactions the starting material, 2α-methyl-4α-bromo-testosterone (II) is reduced preferably with sodium borohydride yielding 2α-methyl-4α-bromo-androstane-3β,17β-diol (III) which upon treatment with a suitable reagent such as zinc in acetic acid at approximately 90° C. for a period of time of the order of 1 hour yields the corresponding 2α-methyl-Δ³-androsten-17β-ol (IV; R=CH₃).

The Δ³-androsten-17β-ol derivative (IV) is oxidized, preferably with chromium trioxide in pyridine, thus affording the corresponding 17-ketone (V). Treatment of this compound with an alkyl, alkenyl or alkynyl magnesium halide as for example methyl, vinyl or ethynyl magnesium bromide, yields the corresponding 17α-alkyl, alkenyl or alkynyl-17β-ol derivative (VI).

The compounds of the present invention represented by the Formula IV are conventionally acylated in pyridine with an acylating agent, as for example acetic anhydride, affording the corresponding 17-acylate. The compounds represented by Formula (VI), are conventionally acylated in the presence of p-toluenesulfonic acid, with an acylating agent, as for example an anhydride of a hydrocarbon carboxylic acid of the type described hereinbefore, to give the corresponding 17-acylates.

The following specific examples serve to illustrate but are not intended to limit the scope of the present invention:

*Example I*

A mixture of 1 g. of testosterone, 2 g. of hydrazine hydrate, 1.2 g. of potassium hydroxide, 1.2 cc. of water and 1.2 cc. of diethylene glycol was heated under reflux for 45 minutes. It was then heated in an open flask until the temperature of the reaction mixture reached 200° C., a reflux condenser was attached, and refluxing was continued for a further 2 hours. The solution was cooled, water added and the product isolated by extraction with ether. Recrystallization of the residue obtained after evaporation of the solvent from acetone-hexane afforded Δ³-androsten-17β-ol.

*Example II*

A solution of 1 g. of sodium borohydride in 3 cc. of water was added to an ice-cooled solution of 1 g. of 2α-methyl-4α-bromo-androstan-17β-ol-3-one. [Mauli et al., J.A.C.S. 82, 5494 (1960)] in 120 cc. of methanol and the mixture was allowed to stand for 16 hours at room temperature. The excess reagent was decomposed by addition af acetic acid, the solution concentrated to small volume in vacuo and diluted with water. The product was extracted with ethyl acetate, the extract was washed with water, dried and evaporated. The solid residue was purified by crystallization from acetone-hexane to give 2α-methyl-4α-bromo-androstane-3β,17β-diol.

Example III

Several batches of the foregoing compound adding up to 7 g. were mixed with 7 g. of zinc dust in 150 cc. of glacial acetic acid and kept at 90° C. for 1 hour at the end of which the mixture was filtered through celite. The filtrate was concentrated to a small volume under reduced pressure, cooled and diluted with ice water to precipitate a crude product. Recrystallization from acetone-hexane afforded 2α-methyl-Δ³-androsten-17β-ol.

Example IV

A solution of 6 g. of Δ³-androsten-17β-ol (obtained in accordance with Example I), in 120 cc. of pyridine, was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded Δ³-androstene-17-one.

2α - methyl - Δ³-androsten-17β-ol was treated by the above procedure yielding 2α-methyl-Δ³-androsten-17-one.

Example V

A solution of 5 g. of Δ³-androsten-17-one in 250 cc. of thiophene-free benzene was treated with 27.5 cc. of 4 N methyl magnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 17α-methyl-Δ³-androsten-17β-ol.

2α - methyl - Δ³-androsten-17-one was treated by the above method furnishing 2α,17α-dimethyl-Δ³-androsten-17β-ol.

Example VI

Using exactly the same conditions described in Example V but substituting methyl magnesium bromide by vinyl magnesium bromide, there were treated Δ³-androsten-17-one and 2α-methyl-Δ³-androsten-17-one yielding respectively 17α-vinyl-Δ³-androsten-17β-ol and 2α-methyl-17α-vinyl-Δ³-androsten-17β-ol.

Example VII

Δ³-androsten-17-one and 2α-methyl-Δ³-androsten-17-one were treated following the technique described in Example V except that methyl magnesium bromide was substituted by ethynyl magnesium bromide, thus furnishing 17α-ethynyl-Δ³-androsten-17β-ol and 2α-methyl-17α-ethynyl-Δ³-androsten-17β-ol.

Example VIII

A mixture of 1 g. of Δ³-androsten-17β-ol, 4 cc. of pyridene and 2 cc. of acetic anhydride was kept at room temperature overnight, poured into ice water, the formed precipitate was filtered, washed with water and dried. Crystallization from acetone-hexane gave Δ³-androsten-17β-ol-acetate.

Using exactly the same conditions described above, there was treated 2α-methyl-Δ³-androsten-17β-ol, thus giving 2α-methyl-Δ³-androsten-17β-ol-acetate.

Example IX

Δ³-androsten-17β-ol and 2α-methyl-Δ³-androsten-17β-ol were treated following the technique described in Example VIII except that acetic anhydride was substituted by propionic anhydride, affording correspondingly Δ³-androsten-17β-ol-propionate and 2α-methyl-Δ³-androsten-17β-ol-propionate.

Example X

Using the same conditions described in Example VIII but substituting acetic anhydride by caproic anhydride. there were obtained Δ³-androsten-17β-ol caproate and 2α-methyl-Δ³-androsten-17β-ol caproate.

Example XI

Following the procedure described in Example VIII except that acetic anhydride was substituted by benzoyl chloride, there were obtained Δ³-androsten-17β-ol-benzoate and 2α-methyl-Δ³-androsten-17β-ol benzoate.

Example XII

A mixture of 1 g. of 17α-methyl-Δ³-androsten-17β-ol, 1 g. of p-toluenesulfonic acid monohydrate, 50 cc. of acetic acid and 25 cc. of acetic anhydride was kept for 24 hours at room temperature. It was then poured into water and stirred until the excess of anhydride had hydrolyzed. Isolation of the product by methylene chloride, extraction and crystallization of the residue from acetone-ether gave the 17-acetate of 17α-methyl-Δ³-androsten-17β-ol.

By the above procedure, there were treated the starting compounds listed below, furnishing the hereinafter disclosed products:

| Starting compounds | Products |
| --- | --- |
| 2α, 17α-dimethyl-Δ³-androsten-17β-ol. | 17-acetate of 2α, 17α-dimethyl-Δ³-androsten-17β-ol. |
| 2α-methyl-17α-vinyl-Δ³- androsten-17β-ol. | 17-acetate of 2α-methyl-17α-vinyl-Δ³-androsten-17β-ol. |
| 2α-methyl-17α-ethynyl-Δ³-androsten-17β-ol. | 17-acetate of 2α-methyl-17α-ethynyl-Δ³-androsten-17β-ol. |
| 17α-vinyl-Δ³-androsten-17β-ol | 17-acetate of 17α-vinyl-Δ³-androsten-17β-ol. |
| 17α-ethynyl-Δ³-androsten-17β-ol | 17-acetate of 17α-ethynyl-Δ³-androsten-17β-ol. |

Example XIII

Using the same conditions described in Example XII, but substituting the acetic anhydride by propionic anhydride, caproic anhydride and cyclopentylpropionic anhydride, there were correspondingly obtained the 17-propionates, 17-caproates and 17-cyclopentylpropionates of the starting materials set forth in the aforementioned example.

We claim:
1. 2α,17α-dimethyl-Δ³-androsten-17β-ol.
2. 2α-methyl-17α-vinyl-Δ³-androsten-17β-ol.
3. 2α-methyl-17α-ethynyl-Δ³-androsten-17β-ol.
4. The hydrocarbon carboxylic acylates of less than 12 carbon atoms of 2α-17α-dimethyl-Δ³-adrosten-17β-ol.
5. The hydrocarbon carboxylic acylates of less than 12 carbon atoms of α-methyl-17α-vinyl-Δ³-androsten-17β-ol.
6. The hydrocarbon carboxylic acylates of less than 12 carbon atoms of 2α -·methyl-17α-ethynyl-Δ³-androsten-17β-ol.
7. A compound of the following formula:

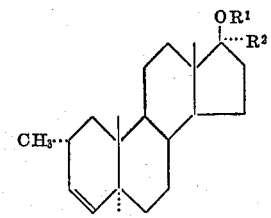

wherein R² is a member of the group consisting of lower alkyl, lower alkenyl and lower alkynyl and R¹ is selected from the group consisting of hydrogen and a hydrocarbon carboxylic acid of less than twelve carbon atoms.

(References on following page)

References Cited by the Examiner

UNITED STATES PATENTS 3,055,916   9/62   Bowers et al. _____ 260—397.3
3,064,014   11/62  Jongh et al. _____ 260—397.5

OTHER REFERENCES

Fieser and Fieser: Steriods, Reinhold Publishing Corp., 1959, page 476.

De Winter et al.: Chemistry and Industry, 1959, page 905.

McKenna et al.: J.C.S. (London), 1959, pages 2502–2509.

Nomine et al.: Compt. Rend. Akad. Sci. vol. 252, No. 25, June 1961, pages 3903–3905.

LEWIS GOTTS, *Primary Examiner.*

IRVING MARCUS, *Examiner.*